(12) United States Patent
Andrieu

(10) Patent No.: US 8,005,832 B2
(45) Date of Patent: Aug. 23, 2011

(54) SEARCH DOCUMENT GENERATION AND USE TO PROVIDE RECOMMENDATIONS

(75) Inventor: Joseph Andrieu, Santa Barbara, CA (US)

(73) Assignee: SwitchBook, Inc., Santa Barbara, CA (US)

( * ) Notice: Subject to any disclaimer, the term of this patent is extended or adjusted under 35 U.S.C. 154(b) by 78 days.

(21) Appl. No.: 11/845,697

(22) Filed: Aug. 27, 2007

(65) Prior Publication Data

US 2008/0059454 A1    Mar. 6, 2008

Related U.S. Application Data

(60) Provisional application No. 60/823,895, filed on Aug. 29, 2006.

(51) Int. Cl.
*G06F 17/30* (2006.01)
*G06F 15/16* (2006.01)

(52) U.S. Cl. ......... 707/731; 707/706; 707/721; 707/737

(58) Field of Classification Search ........... 707/3, 104.1, 707/706, 721, 731, 737, 999.003, 999.005, 707/999.007; 1/1
See application file for complete search history.

(56) References Cited

U.S. PATENT DOCUMENTS

| | | | |
|---|---|---|---|
| 6,285,999 B1 | 9/2001 | Page | |
| 6,453,315 B1 | 9/2002 | Weissman | |
| 6,493,702 B1 * | 12/2002 | Adar et al. | 707/3 |
| 6,816,857 B1 | 11/2004 | Weissman | |
| 2001/0021914 A1 * | 9/2001 | Jacobi et al. | 705/8 |
| 2002/0016786 A1 * | 2/2002 | Pitkow et al. | 707/3 |
| 2004/0059708 A1 | 3/2004 | Dean | |
| 2004/0199497 A1 * | 10/2004 | Timmons | 707/3 |
| 2005/0135596 A1 * | 6/2005 | Zhao | 379/265.01 |
| 2005/0216452 A1 * | 9/2005 | Teague | 707/3 |
| 2005/0216528 A1 * | 9/2005 | Cheng | 707/202 |
| 2005/0262052 A1 * | 11/2005 | Daniels et al. | 707/3 |
| 2006/0069699 A1 * | 3/2006 | Smadja et al. | 707/104.1 |
| 2006/0149578 A1 | 7/2006 | Weild | |
| 2006/0224938 A1 | 10/2006 | Fikes | |

(Continued)

OTHER PUBLICATIONS

Agirre (2001) Agirre E., Ansa O., Martinez D., Hovy E. "Enriching WordNet concepts with topic signatures." Proceedings of the SIGLEX workshop on "WordNet and Other Lexical Resources: Applications, Extensions and Customizations". In conjunction with NAACL. 2001.

(Continued)

*Primary Examiner* — Tony Mahmoudi
*Assistant Examiner* — Dennis Truong
(74) *Attorney, Agent, or Firm* — Brian N. Young; Fountainhead Law Group PC

(57) ABSTRACT

Particular embodiments provide a search service using a search document. Complex, multi-site, multi-query searches may be performed using the search document. To use a search document, a user may activate the service. The search document may then capture data for an entire search performed for the users search across various online and offline resources. One or more partial search results may be determined for a search document. Partial search results may be automatically determined based on one or more resources being visited by a user during a search. Also, partial search results may be specified by a user from pages being visited, such as a user may select items on a page to be included in the search document. The partial search results are then used to provide a recommendation to the user for the specified search.

21 Claims, 8 Drawing Sheets

U.S. PATENT DOCUMENTS

2007/0124194 A1   5/2007   Barnette

OTHER PUBLICATIONS

Agirre and Lopez (2004) Agirre, E. And O. Lopez, "Publicly Available Topic Signatures for all WordNet Nominal Senses." Proceedings of the 3rd International Conference on Languages Resources and Evaluations. 2004.

Agirre, et al (2004) Agirre, E., E. Alfonseca, and O. Lopez, "Approximating Hierarchy-based Similarity for WordNet Nominal Synsets Using Topic Signatures." Proceedings of 2nd International Global WordNet Conference. 2004.

Gonzalo (1998) Gonzalo, J., Verdejo, F., Chugur, I., and Cigarrán, J. "Indexing withWordNet Synsets can improve Text Retrieval." Proceedings of the Workshop on Usage of WordNet for NLP. 1998.

Krovetz, R., and Croft, W. (1993) Krovetz, R., and Croft, W. "Lexical Ambiguity and Information Retrieval." ACM Transactions on Information Systems. vol. 10. Issue 2. 1993. pp. 115-141.

Krovetz (1997) Krovetz, R. "Homonymy and Polysemy in Information Retrieval." Proceedings of the 35th Annual Meeting of the Association for Computational Linguistics. 1997. pp. 72-79.

Leacock et al. (1998) Leacock, Claudia, Chodorow, M., and Miller, G.A. "Using Corpus Statistics and WordNet Relations for Sense Identification." Computational Linguistics, 24(1). 1998. pp. 147-165. http://citeseer.ist.psu.edu/leacock98using.html.

Luk (1995) Luk, A.K. "Statistical Sense Disambiguation with Relatively Small Corpora Using Dictionary Definitions". Proceedings of the 33rd Annual Meeting of the Association forComputational Linguistics.1995.

Mihalcea and Moldovan (2000) Mihalcea, R., and Moldovan, D. "An Iterative Approach to Word Sense Disambiguation." Proceedings of the Thirteenth International Florida Artificial Intelligence Research Society Conference. 2000. pp. 219-223.

Sanderson, M. (1994, 2000) Sanderson, M. "Word Sense Disambiguation and Information Retrieval." Proceedings of the 17th International ACM SIGIR. 1994. pp. 49-57, 142, 151.

Schütze, H., and Pedersen, J. (1995) Schütze, H., and Pedersen, J. "Information retrieval based on word senses." Proceedings of the 4th Annual Symposium on Document Analysis and Information Retrieval. 1995. pp. 161-175.

Stokoe (2005) Stokoe, Christopher. "Differentiating Homonymy and Polysemy in Information Retrieval." Proceedings of the conference on Human Language Technology and Empirical Methods in Natural Language. 2005. pp. 403-410.

Stokoe and Tait (2003) Stokoe, Christopher, and John Tait. "Towards a Sense Based Document Representation for Internet Information Retrieval." NIST Special Publication 500-255: The Twelfth Text Retrieval Conference. 2003. pp. 791-795.

Sussna (1993) Sussna, M. "Word Sense Disambiguation for Free-Text Indexing Using a Massive Semantic Network." Proceedings of the 2nd International Conference on Information and Knowledge Management. 1993. pp. 67-74.

Voorhees (1994) Voorhees, E. "On Expanding Query Vectors with Lexically Related Words." Proceedings of the 2nd Text Retrieval Conference. NIST special publication, No. 500215. 1994. p. 223.

Voorhees (1994) Voorhees, E. "Query Expansion Using Lexical-Semantic Relations." Proceedings of the 17th Annual International ACM SIGIR, Conference on Research and Development in Information Retrieval. 1994. pp. 61-69.

Woods, W. (1997) Woods, W. "Conceptual Indexing: A Better Way to Organize Knowlege." Technical Report: TR-97-61. Sun Microsystems Laboratories, Mountain View, CA. 1997.

Markoff, John. "Searching for Michael Jordan? Microsoft Wants a Better Way" New York Times, NY. Mar. 7, 2006. http://www.nytimes.com/2007/03/07/business/07soft.html?th&emc=th.

Sanderson, M. "Retrieving with Good Sense." Information Retrieval, vol. 2(1). 2000. pp. 49-69.

Ezzy, Ebrahim "Search 2.0 vs Traditional Search, Part 2" Read/Write Web. Jul. 25, 2006 obtained at http://www.readwriteweb.com/archives/search_20_vs_tr_1.php.

Steve Small, et al., "Parsing and Comprehending with Word Experts (A theory and its Realization)", University of Maryland, Chapter 4, pp. 89-147, 1982.

Ellen M. Voorhees, "Using WordNet for Text Retrieval", Chapter 12, pp. 285-303, 1998.

\* cited by examiner

SEARCH DOCUMENT GENERATION AND USE TO PROVIDE RECOMMENDATIONS

CROSS REFERENCES TO RELATED APPLICATIONS

This application claims priority from U.S. Provisional Patent Application Ser. No. 60/823,895, entitled STRUCTURED SEARCH DOCUMENTS FOR COMPLEX USER-DRIVEN SEARCHES, filed on Aug. 29, 2006, which is hereby incorporated by reference as if set forth in full in this application for all purposes.

BACKGROUND

Particular embodiments generally relate to computing and more specifically to search using a search document.

The World Wide Web (WWW) includes a vast amount of information. Search engines are provided to help a user search the information. For example, some search engines use a simple query box where a user may enter a query and be returned possible results. These results typically are brief summaries and hyperlinks to pages on other websites. For simple searches, users can typically resolve their search directly at the search engine or by visiting a single web page. For example, a user may be looking for a restaurant with a certain name and once that restaurant is found, the search is finished.

Other search engines provide multi-entry searches. For example, a user may use multiple entry queries to find flights, hotels, rental cars in a search. This search is typically provided on a proprietary website and thus a user is restricted to results provided only by the proprietary website. Often, the search results using the above methods do not satisfy a user's needs.

SUMMARY

Particular embodiments provide a search service using a search document. Complex searches may be performed using the search document. A complex search may involve an extended process of searching, such as exploration and validation of multiple hypotheses based on resources discovered at various, multiple websites. A resource may be any set of information that a user might access, such as a website or web page, internal document, online or offline resource, etc. A user may indicate an activation of a search document for a search. The activation may start a complex search where the search document may then capture data during an entire complex search performed. For example, partial search results may be determined and stored in the search document. In one embodiment, the partial search results may be considered potential partial search results and indicative partial search results. The potential partial search results may be automatically determined and may not involve a user specifically indicating that the partial search result should be stored in the search document. In one example, the potential partial search results may be automatically determined based on one or more web pages being visited by a user. Thus, as a user navigates to different pages, uniform resource locators (URLs) or other content may be automatically captured into the search document. Also, the indicative partial search results may be content specified by a user. For example, the user indicates that content is relevant by dragging and dropping content into the search document. The partial search results are then used to provide a recommendation to the user for the search document, such as in the form of a summary and hyperlink to an online resource.

The recommendations may be determined in different ways. For example, a representation of a target search document may be sent to a server. The server may also have received many different representations of prior search documents from other users. The server then provides recommendations to the user based on an analysis of the prior search document and the target search document. For example, the indicative partial search results are used to determine a similarity of a prior search document to the target search document. Then, recommendations are determined from potential search results based on the similarity determined from the indicative partial search results.

In another example, a search agent may be used to provide a recommendation. When information is added to the search document, such as metadata, a search agent may automatically determine recommendations. For example, the metadata may be determined for a first website. The search agent may be associated with a second website and may generate a query for the second website. The query may generate recommendations that may be provided to a user. Other methods of providing recommendations may also be appreciated and will be described below.

A further understanding of the nature and the advantages of particular embodiments disclosed herein may be realized by reference of the remaining portions of the specification and the attached drawings.

DETAILED DESCRIPTION OF EMBODIMENTS

Overview

Figure 1:
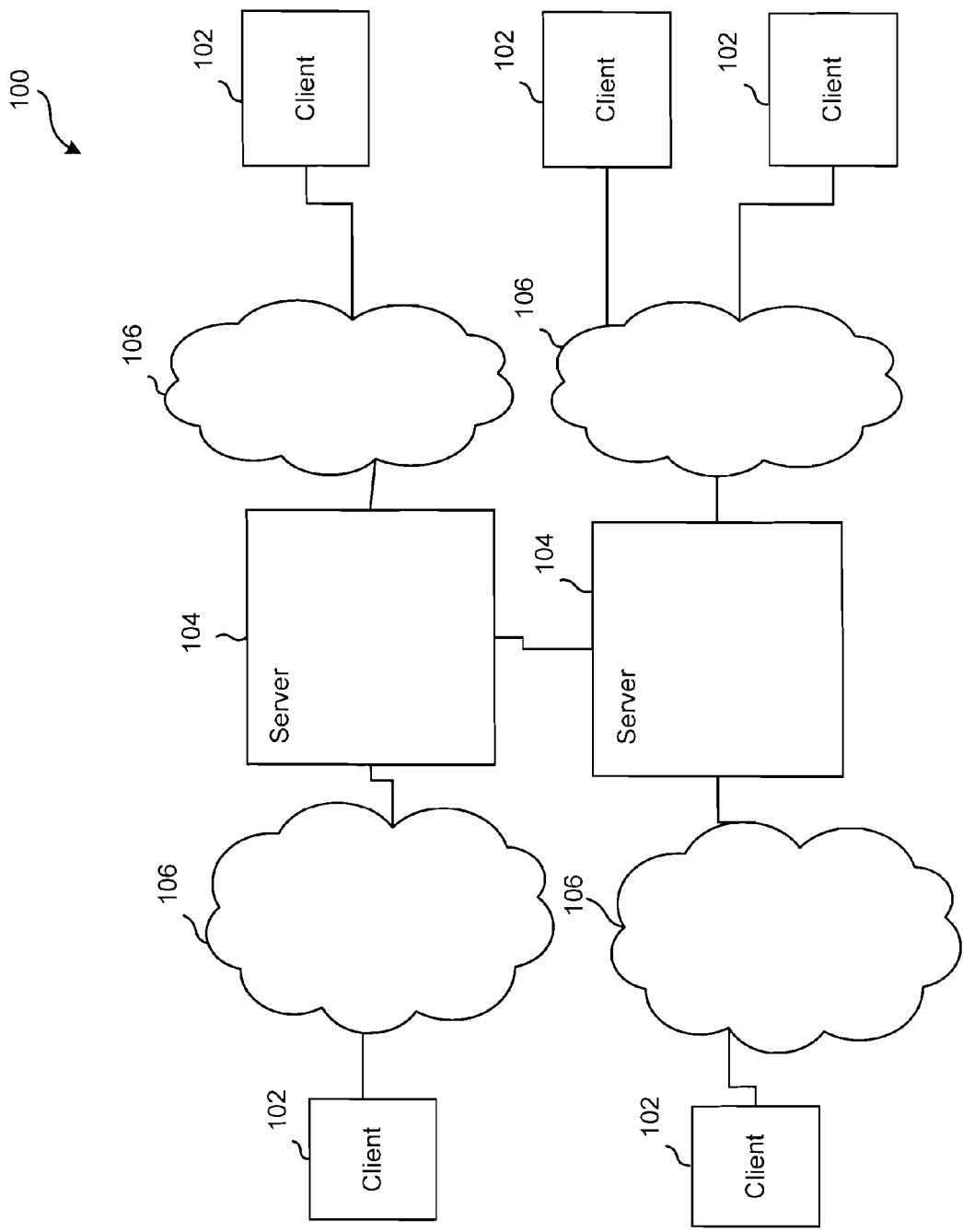
FIG. 1 depicts an example of a system for providing recommendations according to one embodiment.

FIG. 1 depicts an example of a system 100 for providing recommendations according to one embodiment. As shown, a plurality of clients 102, a plurality of servers 104, and networks 106 are provided. It will be understood that any number of clients 102, servers 104, and networks 106 may be provided.

Client 102 may be any device used by a user to perform searches. Client 102 may include personal computers, laptops, cellular phones, personal digital assistants (PDAs), smart phones, set top boxes, etc.

Clients 102 may include software that is used to navigate the World Wide Web (WWW) or other public or private data networks, such as listservs, message boards, etc. For example, an Internet browser may be used to navigate to uniform resource locators (URLs) for different websites. Users may download web pages using client 102. In one example, client 102 downloads web pages from servers 104. Although web pages are described, it will be understood that clients 102 may be used to search any kind of documents.

Server 104 may be configured to interact with clients 102. In one example, servers 104 may provide web pages to clients 102. In particular embodiments, servers 104 may also provide recommendations to clients 102 based on representations of search documents that are received from clients 102.

Networks 106 may be any networks used by clients 102 and servers 104. For example, networks 106 may include the Internet, a local area network (LAN), a wireless network, etc.

Particular embodiments provide a search document that allows a user to perform complex searches. The complex search may be more than just a single entry or multi-entry search that is individually performed by a user. Search documents may be used to track user activity during a multi-stage search. For example, the search may address buying a home or a car, which may involve an extended process of exploration and validation. The complex search may involve a user performing many query-based searches, navigation to many informational web pages, etc. Also, a user may have many questions that need to be answered, such as:

Is this a good price?
Is it a good neighborhood?
How are the schools?
How much crime is there?
How bad is the traffic?
Is there shopping nearby?

A user may perform multiple independent queries for each of the above questions. Conventionally, each query is treated independently from the prior query. That is, a conventional search engine does not take into account a prior request in responding to a current query. A user may alter the query terms inputted for a search based on previous results; however, this may not be efficient. In contrast, a search document provides a way to track and organize a user's search process and a means for users to indicate which resources actually match their search. For example, as a user queries for information to answer the above questions, partial search results may be captured and stored in the search document. A query may be any action taken during the complex search process. This may include accessing different resources, which may be associated with various proprietary entities. For example, the resources may be different websites (e.g., different top level URLs), intranets for different companies, multiple different search providers or services, etc. A user may access many different web pages that include content. A query may also be performed at a search provider, such as at a search engine. Then, more web pages may be accessed, in which a query is entered at the performed in a web page, such as searching a proprietary web site for a retailer. After this, an intranet or a proprietary database may be searched. These are all actions that can take place in the complex search. During the process, partial search results may be determined from the various resources accessed, and stored in search document 202. As the partial search results are stored in the search document, different ways of generating recommendations may be provided. Accordingly, the process of capturing partial search results is for the purpose of providing recommendations. When a user stores something in search document 202, it is used for determining recommendations. This is different from storing information to just keep track of it for later perusal. Before describing recommendation generation, the structure and generation of a search document will be described.

Interface

Figure 2:
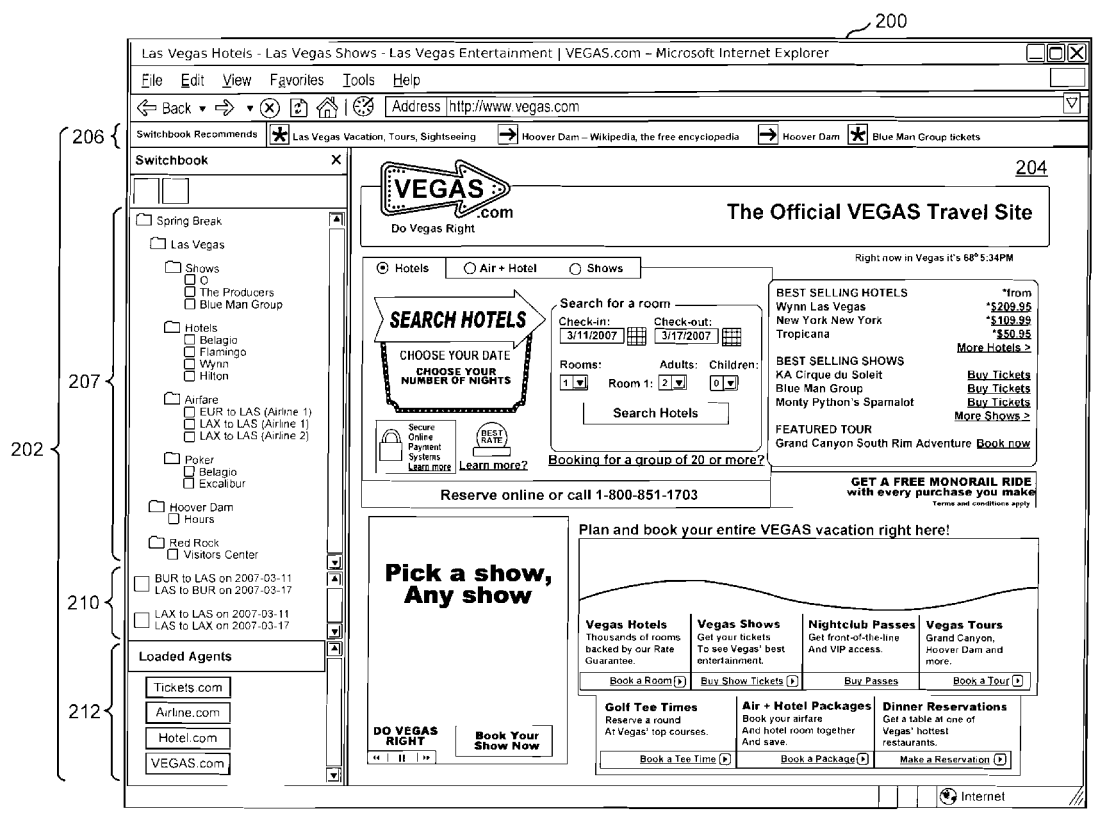
FIG. 2 depicts an example of an interface according to one embodiment.

FIG. 2 depicts an example of an interface 200 according to one embodiment. Interface 200 may be an interface that is used to access resources. Resources may be any set of information. For example, any information potentially accessible to a user, such as websites or web pages, documents on an intranet, database information, etc., may be a resource. In one example, interface 200 may include a web browser that may be used to search various web pages. For example, a web page may be accessed using a URL. In this case, the resource may be considered the web page associated with the URL and the resource is identified by the URL.

In window 204, a web page is shown, which displays various information. The web page may be coded using hypertext transfer markup language (HTML), or any other language. During a complex search, a user may access different web pages 204.

The functionality provided by search document 202 may be provided in software code that may be downloaded from server 104 to client 102 in one embodiment. The download may be in the form of a plug-in for an Internet browser, a JavaScript, etc. Also, the software code may be pre-installed on a computing device being used or distributed through other means such as a CD or DVD.

An interface to search document 202 is provided to a user. Thus, a user can access and edit search document 202. For example, search document 202 may be displayed in the Internet browser as the user navigates to different web pages. Thus, search document 202 is not associated with any one proprietary resource such as a search engine or website. Also, although search document 202 is shown as being displayed in interface 200, it may be minimized or closed, but the functionality described may still run in the background. A user may at a later time re-display search document 202.

Different search documents 202 may be created for different complex searches. In this case, search document 202 is for a search being performed for a user's spring break vacation. Other search documents may be created for different searches, such as searches for a new car, a new job, etc. Search document 202 tracks user activity during a search and allows a user to directly participate in development of search document 202. For example, a user may organize and edit search document 202, capture partial search results into search document 202, and share search document 202 with other users. Users may activate a search document or switch between different search documents to receive recommendations specific to each particular document.

Search document 202 may be organized into a meta-model. A meta-model may be an organizational structure of partial search results that have been determined from a user's search. The meta-model may be organized in different ways and portions of it may be shown in a visual form to the user.

Partial search results may be any information that is determined during a user's search. Because complex searches are being performed by a user, many different queries may be made during different aspects of the search. Partial search results may be determined during any aspect of the search and stored in search document 202. In one embodiment, the partial search results may be considered potential partial search results and indicative partial search results.

The potential partial search results may be automatically determined and may not involve a user specifically indicating that the partial search result should be stored in the search document. In one example, the potential partial search results may be automatically determined based on one or more resources, such as web pages, being visited by a user. Thus, as a user navigates to different pages, uniform resource locators or other content may be automatically captured into search document 202.

Indicative partial search results may be specified by a user. For example, the user indicates that the partial search result is related to the search by selecting a portion of content on a web page. Alternatively, the user may indicate that the specified partial search result is counter-indicative for their search. For example, the user may specify that while Florida vacation ideas are valid partial results, Walt Disney World is not. The counter-indicative partial result may then be used to refine recommendations that are determined. For example, not only may recommendations for Walt Disney World not be determined but recommendations that are related to theme parks may not be determined or may have a lowered probability of being determined.

As shown, search document 202 is organized into three sections, an indicative partial result section 207, a metadata section 210, and an agent section 212. However, it will be understood that partial search results may be organized in interface 200 in different ways. For example, two separate sections for indicative partial search results and potential partial search results, a single section, or other variations may be provided.

A template for search document 202 may be used. The template may be pre-installed in an Internet browser or on client 102 or may be downloaded by a user. The template may be a blank template in that in does not include any folders 208 or partial search results. A user can then create search document 202 as the search is performed. Also, pre-defined templates may be provided. For example, if a user is searching for a vacation, then a vacation template may be used that has folders 208 labeled for a vacation category, such as flight, airfare, hotel, etc. These folders 208 may also include pre-defined partial search results. Additional partial search results may then be added to search document 202.

Indicative result section 207 may be in the form of a tree-like hierarchical structure; however, other forms may be appreciated, such as lists, indexes, flowcharts, etc. Folders 208 may be used to organize and tag indicative partial search results. Although folders 208 are shown, it will be understood that folders 208 may not be included; rather, partial search results may just be stored in search document 202 without the use of folders. Folders 208 may be any instance that can categorize indicative partial search results. The labels may be created by a user or may be automatically created. For example, folders 208 represent different categories and sub-categories of indicative results (as shown by sub-folders) for a specified search. A main folder 208-1 is labeled "Spring Break", and contains indicative partial results related to spring break. Sub-categories include Las Vegas, Hoover Dam, and Red Rock. These sub-categories represent different aspects of a user's overall search. In this case, the user may be thinking of traveling to Las Vegas, Hoover Dam, and Red Rock during their spring break vacation.

Indicative partial search result section 207 shows partial search results that have been received from resources that were accessed during querying performed by a user. For example, partial search results include resources from web pages 204, metadata, text, or other information that may be derived from web pages 204. Each sub-folder 208 includes partial search results. For example, the sub-folder labeled "Shows" includes partial search results in the form of O, The Producers, and Blue Man Group. These partial search results may include information captured from web pages in which a user was searching for shows to go to while in Las Vegas.

If a user provides a label for a folder, it may be used to determine a context for the content of that folder and vice-versa. That context can help clarify what a user is actually searching for. For example, if a folder is labeled "work" and five job opportunities in fast food are provided in the work folder, then it may be determined that "work" (for this search) means "fast food job". However, another user may have the same label of "work" and have political internships stored in that folder. In this case, "work" means "political internships". This provides insight into what a user is really searching for.

Metadata section 210 may also include metadata that is extracted or generated from resources viewed by a user. The metadata may be from indicative partial search results and/or potential partial search results. The meta-data may be automatically captured when a web page is accessed, determined from potential partial results, etc. Metadata section 210 includes information for flights that the user has searched for. The metadata may be used to automatically perform other searches at search providers. A search provider may be any provider that allows a search to be performed, such as a search engine, a website with a search tool, a search agent, etc.

Agent section 212 includes agents, such as search agents, export agents, etc. Agents may be stored in search document 202 and may be macros or customization bundles that may perform different actions. For example, search agents use the metadata to automatically perform searches at other search providers. The metadata may have been determined from a first website, Southwest Airlines, and is used to determine recommendations for another website, such as Expedia.com.

Folders 208 may also perform active tasks based on search document items captured. For example, folders may include active folders that contribute directly to the meta-model of search document 202 and provide customizations to the provided interface. For example, active folders may include a search agent that may manipulate search document 202 by generating partial search results, providing recommendations, adding folders 208, customizing presentation of different folders 208, adding sub-folders 208, etc.

In one example, an active folder may be a budget folder. In this case, the active folder may be a budgeting tool that may keep track of expense items for the search category. For example, when an indicative partial search result is captured and dropped on a budget folder, an agent for the folder processes the indicative partial search result. For example, if a dollar amount can be determined from the indicative partial search result, that dollar amount is added to an ongoing budget represented by the folder. As the user searches different web pages for different parts of his/her trip, selected information may be added to the budget folder. Thus, a user may have costs of a trip added up, such as the cost of airfare, hotel, rental car, etc. which may be automatically added up using the search agent.

Agent section 212 may also include potential partial results. For example, all the queries run by a search agent may be displayed as potential partial results associated with that agent. This process will be described in more detail below. Also, potential partial results (e.g., URLs) may be stored as a user is performing queries and navigating to web pages. Other information that may be automatically captured includes text in a web page or document that is deemed relevant, metadata, etc. The potential partial search results may be considered potential because they have not been selected by a user to be included in search document 202. Thus, they may be relevant to the search being performed by the user or may not be. For example, a user may visit a web page and have no further interactions with it. Thus, the URL may be captured as a potential partial search result, but it may not be relevant because the user found nothing of use. In this case, the potential partial search result may be removed. For example, a user may specifically remove the potent partial search result, it may be automatically removed based on a criteria, it may expire, etc. Also, a user may indicate that a potential partial search result is important; thus, it may become an indicative partial search result.

Search Document Generation

Figure 3:
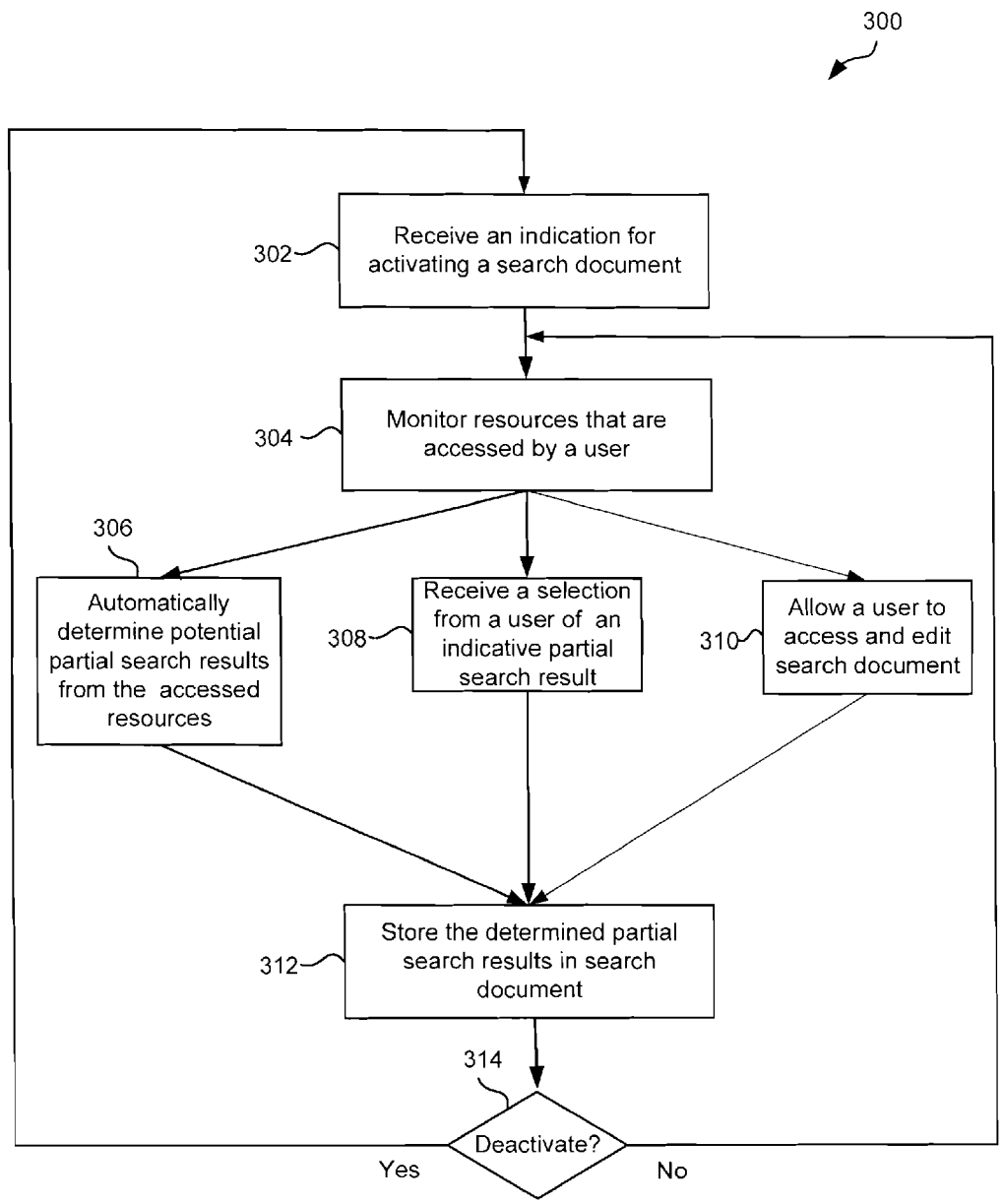
FIG. 3 depicts an example of a flowchart of a method for generating a search document according to one embodiment.

The generation of search document 202 will now be discussed in more detail. FIG. 3 depicts an example of a flowchart 300 of a method for generating search document 202 according to one embodiment. Step 302 receives an indication for activating a search document 202. A user may not always want search document 202 active. For example, because search document 202 may be automatically capturing potential partial search results, the user may not want to have a search document active while casual browsing is being performed or a user may wish to have one search document for a particular search, such as for a vacation, and another search document for another search, such as for a new car. Activating a search document 202 at times when the complex search is being performed may provide better results because what may be more relevant partial search results are likely to be captured. For example, the potential partial search results may be automatically captured while the user is browsing web pages that may be relevant to the complex search as opposed to times when the user is performing other actions not related to the complex search, such as checking email. Thus, when a user starts a search, the search document may be activated.

Step 304 monitors resources that are accessed by a user. For example, the resources may be web pages that are accessed by a user. As a user accesses different web pages, information found in web pages 204 is parsed. The information may be text information, code (HTML), metadata, etc.

Steps 306, 308, and 310 may be performed at different times. For example, the steps may all occur or only some of the steps may occur. Step 306 automatically determines potential partial search results from the accessed resources. For example, information that may be deemed relevant to search document 202 is automatically captured. Also, the potential partial results may be created, such as a section is extracted and created as a potential partial result. The determination of which information is relevant may be based on criteria, such as existing partial results, labels for folders 208, etc. For example, the labels for folders may be used to find similar content in a web page. Also, content that is similar to existing indicative or potent partial search results that are stored in document 202 may be captured. Also, information may always be captured as potential partial search results, such as the URL of the resource visited, a title of a file accessed, resources represented as links in web page 204, metadata associated with a web page, text from the web page, etc. Other ways of capturing potential partial results may also be used, such as through search agents or recommendation generation.

As discussed above, another way of capturing information for search document 202 is from a user selection. For example, step 308 receives a selection from a user of an indicative partial search result. In one example, the user may drag and drop an item (e.g., a section of text) from web page 204 onto search document 202. For example, information for a hotel, such as the name, price, and dates, may be dragged and dropped into search document 202. In this case, information for the search document item may be hypertext transfer mark-up language (HTML) for the item or other information. Further, icons or buttons may be provided next to potential partial search results on web page 204. For example, web pages may be annotated with icons next to items on a web page. A user may select the icon and then the potential partial search results become indicative partial search results.

Step 310 allows a user to interact with and modify search document 202. For example, an interface to search document 202 is provided where the user can view the contents of search document 202. The user may then decide to edit the contents of search document 202. Any actions taken by a user with respect to search document 202 may affect recommendations determined. For example, folder labels are shown in FIG. 2 as folders 208 and used for organizing the partial search results. As shown, different folders 208 and sub-folders 208 may be provided. Users have direct access to search document 202 and may organize and generate the folder labels in addition to placing the indicative partial search results in different folders and adding their own commentary and notes. For example, users may drag and drop partial search results on a folder. Also, the users may re-organize indicative partial search results among the folders. Users may also delete folders and partial results. The structure of label names and where a user places indicative results may affect which recommendations are provided. For example, as discussed below, the ratings for the recommendations may be affected based on user interaction and modification of search document 202. Users may, after using the system, learn to provide better labels for the folders to receive better recommendations.

Further, any edits made to search document 202 may provide immediate feedback and context to the structure of search document 202, which may change the recommendations provided. For example, the indicative partial results may be used to allow the user to search by example, using the document as an exemplar of desired results. If indicative search results are deleted, then recommendations may be regenerated if they were previously generated. Also, the deletion of partial search results indicates that the user may not be interested in recommendations related to those partial results. Also, selecting an indicative partial search result from a web page 204 and placing it into a labeled folder 208 indicates a certain interest in that indicative partial search result. By providing a label, a category is applied to that indicative partial search result and gives it context. This context may be used to generate recommendations. Further, as discussed below, when a user interacts with the recommendations provided, context can be determined as to which recommendations are good and bad.

Step 312 stores the determined partial search results in search document 202. The partial search results may be organized in search document 202. For example, indicative partial search results are organized according to folders 208. The folder in which to store partial search results may be automatically determined. Further, a user may indicate which folder partial search results should be stored in during different time periods or queries. For example, the user may indicate store all partial results in this folder until I specify otherwise.

In one embodiment, the folder labels may be intelligently generated. For example, when a user navigated to the vegas.com website, a folder for Las Vegas may have been intelligently created based on information in web page 204. Also, a user may have created and named the Las Vegas folder. The labels may be used to guide recommendations that are provided as described below. However, the labels may not always be semantically complete; rather, the information contained in the folder may provide more information as to what the label really means. For example, if air fare items are found under Las Vegas, then the Las Vegas folder is more correctly described as air fares to Las Vegas.

Step 314 determines if the complex search is deactivated. For example, a user may end the complex search to start querying for a different complex search. For example, after performing a complex search for a vacation, the user may want to start a complex search for a new home. If a user decides to deactivate the search, the user may then start a new complex search at step 302. Also, if the user does not deactivate the search, the process may reiterate to step 304 where resources continue to be monitored.

Potential partial search results in search document 202 may also expire after a certain amount of time. For example, after a certain number of days older potential partial results may be automatically deleted. Also, a user may specify how long partial search results should last or limit result history to a specific number of entries.

Recommendation Generation

Once search document 202 is generated, different actions may be performed. For example, recommendations may be provided. These recommendations may be organic recommendations, agent recommendations, or recommendations created by other users.

Figure 4:
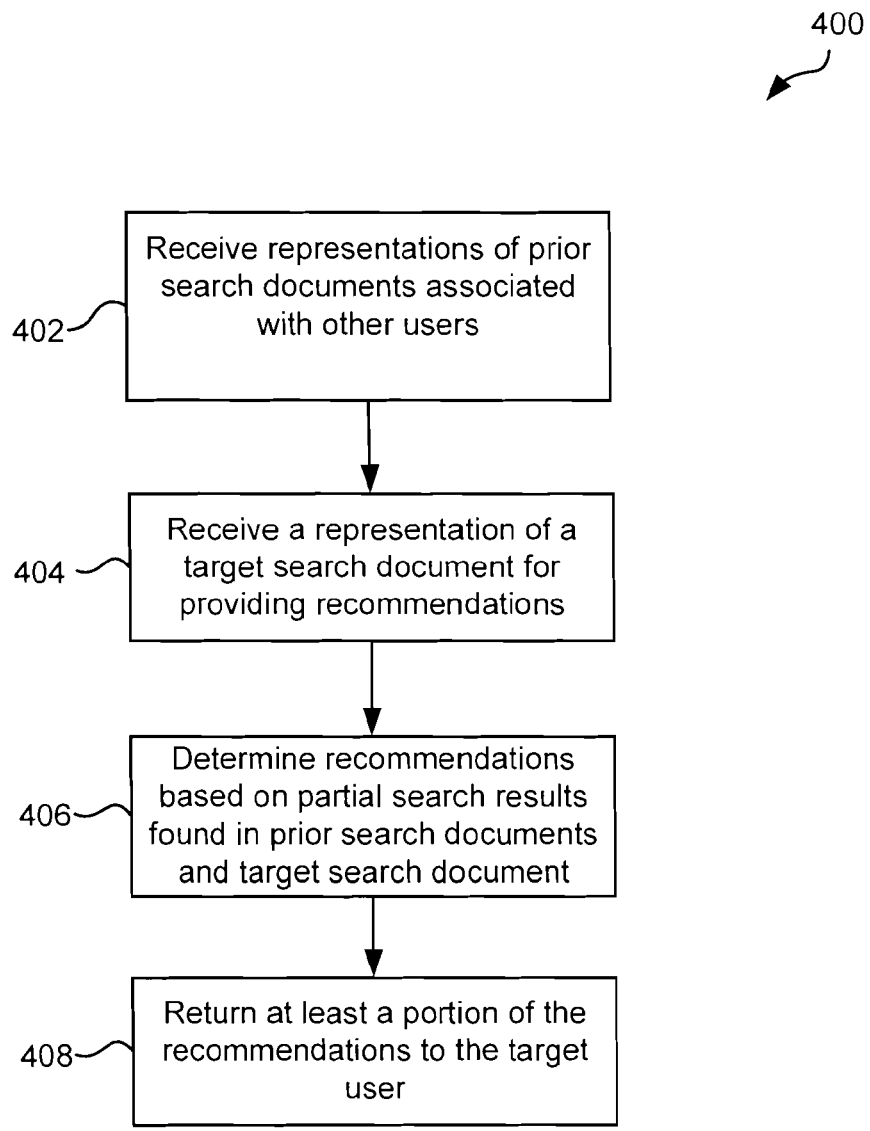
FIG. 4 depicts a flowchart of a method for determining organic recommendations according to one embodiment.

FIG. 4 depicts a flowchart 400 of a method for determining organic recommendations according to one embodiment. Step 402 receives representations of prior search documents 202-2 associated with other users. For example, multiple other users may have generated their own prior search documents 202-2 for searches they are performing. The target search document 202-1 and prior search documents 202-2 from other users are received at server 104 in one embodiment. Also, it will be understood that processing may be distributed among servers 104, servers 104 may communicate to provide recommendations, and different servers 104 may perform the same functionality. In other embodiment, the prior search documents 202-2 from other others may be received at client 102 where client 102 will do the processing described below. For discussion purposes, it is assumed that server 104 performs the processing described.

Step 404 receives a representation of a target search document 202-1 for providing recommendations. The process will be described as referring to target search document 202-1, which is the search document for which recommendations will be provided. Prior search documents 202-2 are any representations of search documents received from other users, such as search documents previously received.

A representation of prior search documents 202-2 and target search document 202-1 may be received. For example, the representation may include vectors that have been generated from information in search document 202. The vectors may weight words in search document 202 by frequency of use. For example, a TF-IDF weight (term frequency-inverse document frequency) may be used as a statistical measure to evaluate how important a word is to a search document 202. The TF-IDF weight increases proportionally to the number of times a word appears in the document but is offset by the frequency of the word in general use, so the use of uncommon words such as "zebrafish" or "poltergeist" receive a higher weight than common words such as "cat" and "house" and "man". Also, the representation may include a rating of partial results discovered or generated during the search. For example, URLs that a user has visited that have been captured in search document 202 may be provided, as well as recommendations the user has considered (by viewing the summary) but not visited. Also, any other edits to search document 202 may be considered in the weighting. For example, if a user edited a partial search result to indicate a positive interest in it, the weighting may be higher for that partial search result in the TF-IDF. It will be understood that the representation may also be in other forms. For example, the whole search document 202 that has been generated on client 102 may be received.

Step 406 determines recommendations based on partial search results found in prior search documents 202-2 and target search document 202-1. The recommendations may be determined based on other aspects of searches being performed by prior users. Thus, the recommendations are determined by actions of prior users. The use of other users' prior search documents 202-2 may be thought of as using other users to spider the Internet. Accordingly, particular embodiments may not spider the Internet to index all web pages found (but they could be used in providing recommendations). Rather, information from the web pages that have been searched by a prior user is used to provide recommendations. This may provide more relevant recommendations for a target user because if multiple prior users with similar indicative partial search results have expressed interest in a website, it may be more likely that a recommendation from that prior user may be more relevant to the target user. For example, if a number of prior users have found similar partial search results to the target user and have also found a partial search result not found by the target user, then the target user may be interested in the partial search result not previously found. Also, only portions of the web page may be captured as partial search results. Thus, only the most relevant portion of the web page may be considered in providing the recommendations. Thus, the recommendations may be more focused and may provide more relevant results.

In one example, the recommendations may be resources that are determined from the partial search results. For example, the partial search results may include URLs for resources, which are then rated and ranked. A portion of these resources may then be determined as recommendations. A process for determining recommendations will be described in more detail below in FIG. 5.

Step 408 returns at least a portion of the recommendations to the target user. For example, a recommendation toolbar 206 of search document 202, as shown in FIG. 2, may be used to display recommendations. For example, the four top-ranked resources are shown in recommendation toolbar 206. The user may click on these recommendations and be brought to a resource (e.g. a web page) that corresponds to the recommendation. Other embodiments of recommendation toolbar 206 may also be appreciated. For example, URLs may be provided in another window, a web page of recommendations may be provided, etc. Recommendation bar 206 may provide different functionality when displaying the recommendations. For example, when a user hovers the mouse pointer over a recommendation, a brief summary and hyperlink for the recommendation may be shown. In one embodiment, the recommendations may be considered potential partial results because they are automatically generated. The recommendations may then be later use to determine additional recommendations. The recommendations may be stored in search document 202 as potential partial results.

Figure 5:
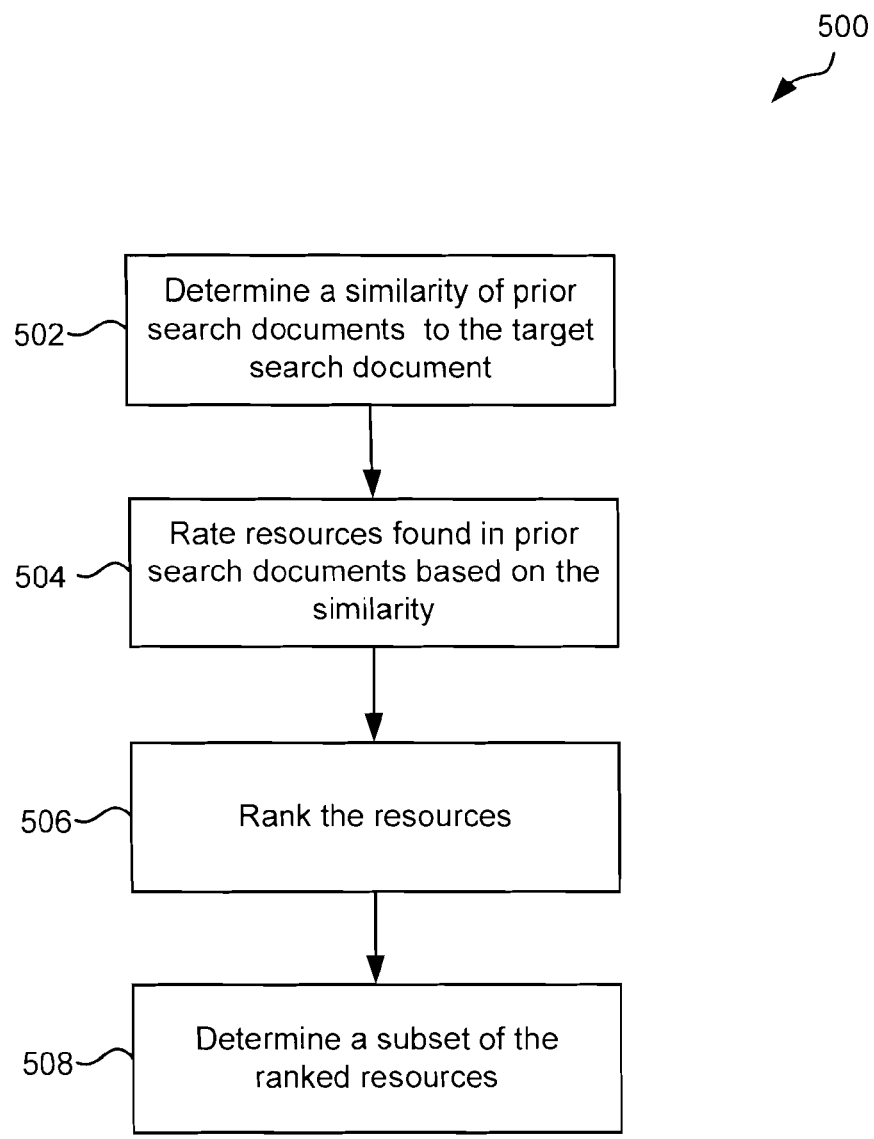
FIG. 5 depicts a flowchart of a more detailed method for determining organic recommendations according to one embodiment.

FIG. 5 depicts a simplified flowchart 500 of a method for determining recommendations according to one embodiment. Step 502 determines a similarity of prior search documents 202-2 to the target search document 202-1. The similarity of a prior search document 202-2 to target search document 202-1 may be determined in different ways. For example, a similarity rating may be determined, which may then be used to rank prior search documents 202-2. In one example of determining similarity, a single TF-IDF matrix representing each search document 202 is determined. The TF-IDF may be determined from any information in search document 202. In one embodiment, the indicative partial search results are used to determine the similarity. Thus, the user-specified content is used to determine similarity between prior search document 202-2 and target search document 202-1. The user-defined content may be used because a user has indicated the content is interesting to them and may be a reliable indication of it being important to search document 202. However, potential partial search results may or may not be of interest to a user. Thus, they may not be used in determining a similarity; however, in other embodiments, they may be included.

A cosine function may be used to determine a similarity rating between the TF-IDF matrix of a prior search document 202-2 to target search document 202-1. The output of the cosine function is a similarity between a prior search document 202-2 and a target search document 202-1. Although a cosine function is described, it will be understood that other functions may be used. Also, other information may be used to determine the similarity, such as the interaction and modification of search document 202. For example, the labels for folders 208 may be used to determine a similarity. In one example, if a folder is named Las Vegas in a prior search document 202-2, it may be deemed that the prior search document 202-2 may be similar to target search document 202-1. Also, potential partial search results may be used to determine which prior search documents 202-2 are similar. Other methods of determining a similarity will also be appreciated.

Once the similarity is determined, step 504 rates resources found in prior search documents 202-2. For example, potential partial search results are used to determine the recommendations. The potential partial search results may include identifiers to resources that were captured during aspects of a prior user's search. For example, the resources may be URLs for web pages that were accessed by a user, a title for a document, recommendation summaries viewed by a user, etc. Also, resources may be other information that may provide a recommendation for a user. For example, a prior search document with high similarity to a target "Las Vegas" search document may include resources related to The Blue Man Group and Celine Dion, two shows performed in Las Vegas and considered by the user of the prior search document when that user performed the specified prior search.

The rating of resources may be determined in different ways. For example, the similarity rating and indicativeness rating may be combined to weight each resource in a prior search document 202-2. In one example, for each resource in a prior search document 202-2, the similarity rating for that document is multiplied by an indicativeness rating for the resource. The indicativeness rating may be a value of how indicative the resource is considered to be to a user. For example, a resource that is considered highly important to a user may have a high indicativeness rating. This provides a contribution to a recommendation value for the resource. For example, if a user had dragged and dropped the resource into prior search document 202-2, then a higher indicativeness rating may be applied to that resource by that prior search document 202-2 because the user has explicitly expressed an interest in the resource. However, if the resource had been automatically captured, then a lower indicativeness rating may be applied to the resource. Also, if a user had hovered their mouse pointer over a recommendation or selected a recommendation shown in recommendation bar 206, then a higher indicativeness rating may be assigned to that recommendation. Conversely, the user activity may specify that a given recommendation is counter-indicative for their search, for a negative indicativeness rating for that recommendation.

Contribution values may be determined for all resources in prior search documents 202-2. Some prior search documents 202-2 may include the same resource. Thus, these resources may be weighted more heavily because multiple users have shown an interest and thus they may be more relevant. Thus, when a single resource is referenced by multiple prior search documents 202-2, the contribution value may be summed for each occurrence of the resource to generate a recommendation value. That is, the similarity rating times the indicativeness rating for all occurrences of a resource is summed. When this process is finished, each resource has an associated recommendation value and is thus rated.

Step 506 ranks the resources. The resources may be ranked according to the recommendation rating determined in step 504. The ranking may rank the resources from highest contribution value to lowest contribution value. The recommendation value and ranking may also be influenced by other factors such as the reputation of the user who created a prior search document or the co-membership of users in a specified social network or group.

Step 508 determines a subset of the ranked resources. For example, the top ten resources may be determined as being relevant to the user. Although a subset is described, it will be understood that all the ranked resources may be provided to a user. For example, a web page that includes multiple pages of ranked resources may be provided.

Thus, indicative partial search results were used to determine a subset of resources found in the potential partial search results. The indicative partial search results are specified by a user and thus were explicitly marked to be of interest to a user. The indicative partial search results are thus used to determine a subset of the potential partial search results to return as recommendations.

Accordingly, particular embodiments use information in prior search documents 202-2 created by users to provide recommendations. Thus, information that was either deemed relevant automatically or specified by a user is used to determine the recommendations. It may be expected that information found in prior search documents 202-2 may be considered relevant by the user who created the search document. This may be especially the case because a user can edit prior search documents 202-2 thus removing information they do not deem as relevant. Thus, when similarity between target search document 202-1 and a prior search document 202-2 is found, it may be expected that resources found in the similar search documents may be relevant to the target search document 202-1. Better recommendations may be provided using prior search documents 202-2 from other users.

Figure 6:
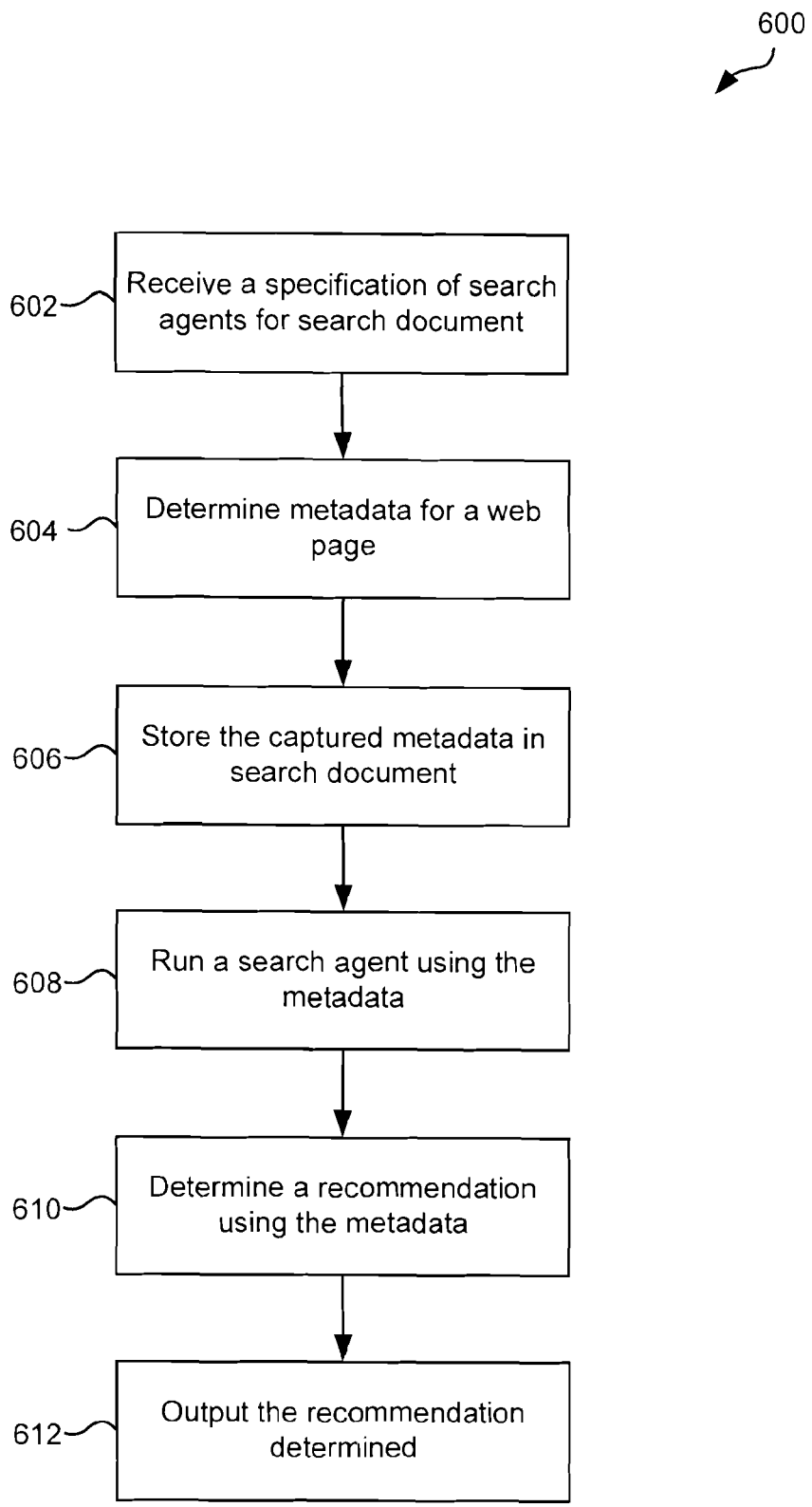
FIG. 6 depicts a flowchart of a method for using a search agent to provide recommendations according to one embodiment.

The recommendations may also be provided using search agents. FIG. 6 depicts a flowchart 600 of a method for using a search agent to provide recommendations according to one embodiment. Search agents may be macros or customization bundles that may use partial search results to provide recommendations. The search agent may run a script using a partial search result specified by a user.

The search agents may use meta-data from websites to generate recommendations from other websites automatically. For example, when searching for a vacation, a user may visit many different sites, such as sites for airline tickets, hotels, rental cars, etc. While entering queries on these sites, information may be entered, such as travel dates and times, price preferences, number of people, special needs, etc. This information may be captured as metadata from the sites as it is entered.

Agents may also use meta-data to automatically fill in forms during a search. For example, information entered at Expedia and captured as meta-data may be automatically entered when the user visits Southwest Airlines or Hilton.com during the same search.

Step 602 receives a specification of search agents for search document 202. For example, a user may specify which search agents should be used in search document 202, which data, and which search provider. This will adjust the recommendations that are provided. Accordingly, a user may customize which search agents are associated with search document 202. When metadata is captured for websites, the search agents may be used to provide recommendations from a selected search provider or the agent may be used to generate metadata for a specified resource. For example, travel data may be associated with a travel search agent and an Expedia agent may be specified as provider of travel meta-data and associated with Expedia's web page. The Expedia agent extracts the travel meta-data and stores it in search document 202. The specified travel search agent uses that travel meta-data to access a travel search provider. The search agents are triggered by search document 202. Thus, the user has control over which search agents should be applicable for which search documents 202.

As a user is performing a search, step 604 determines metadata for a web page. For example, the metadata may be captured by analyzing a structure of a web page. The metadata may be acted on whenever new data is detected. For example, travel meta-data may be stored. Whenever new travel metadata (e.g., new dates) are detected on a travel web page, the new meta-data may be captured. The common data used in related queries across web sites may be generalized in a form that can be used to capture metadata from web sites without the use of a custom agent. For example, a meta-data model may be developed for travel web sites that can capture meta-data as it is submitted or entered. Also, meta-data may be captured by a user selecting a portion of a web page that includes the meta-data or by dragging and dropping the portion into search document 202. Also, the metadata may be automatically determined using artificial intelligence (AI) techniques, such as natural language processing.

Step 606 stores the captured metadata in search document 202. For example, the search document information may be stored and presented in metadata area 210. Also, the metadata may be stored in folders 208 as indicative partial search results. The section of where metadata is stored may be determined automatically or may be organized by a user.

Step 608 runs a search agent using the metadata. For example, metadata may be dragged onto one of the search agents by a user. For example, when a user wants to apply the metadata to one of the search agents, it may be dragged and dropped onto that search agent. For example, the metadata may have been captured from a Southwest Airlines web page. If the user wants to have the metadata applied to another website, such as Expedia.com, metadata may be dropped onto the Expedia.com search agent icon. In other embodiments, once metadata is captured, search document 202 may intelligently recognize that the metadata is of a type that is usable by a specified search agent. Thus, the search agent may be automatically invoked and run using the metadata. In other embodiments, search agents subscribe to particular classes of meta-data and are authorized to access that meta-data by a user, at installation time; when meta-data of that class is created or modified, subscribed agents are invoked with the new meta-data Step 610 determines a recommendation using the metadata. A search agent may provide a mapping from data entered for a first web page to an interface for a search provider. For example, a search agent may specify how to format particular meta-data as a search query for a specified second web page. This allows the search agent to automatically fill in forms on the second web page, generate queries to be submitted, etc. For example, given the destination and dates captured from meta-data, a search agent can map the data to a query on a second web site. In one example, metadata received from a travel website can be used to form a query to a weather web site to provide the weather for the user at the destination during the time of interest.

In a specific example, the search agent may open a small, private XHTML-based dialogue designed for generating a query at the search provider. For example, a search may be run on a webpage associated with the search agent. In this case, the website Expedia.com may be opened and a search may be performed according to the parameters associated with the metadata. For example, a search with the same dates, location, and number of persons may be performed. Thus, a search agent can dynamically respond to users' searches by provided related information available from other sources.

Step 612 then outputs the recommendations determined. For example, the recommendations may be output in recommendation bar 206. In one example, the recommendation may be different flights that can be searched for on Expedia.com based on the metadata captured from the Southwest Airlines website, the weather at the destination from a weather website, etc. Also, the search agents may change the interface. For example, a pop-up window may be generated with the recommendations. Also, folders may be changed, such as the budget shown for a folder may be updated with a new number value. The recommendations may be stored in search document 202 as potential partial results.

Agents may also be used to perform other actions. For example, the agents may also be presentation agents, which are configured to present recommendations in certain formats to users. A presentation agent may display a customized presentation of partial results, such as in a table format. Also, the agents may be export agents, which are configured to export information to a specified destination. For example, the export agent may export information to a file, another application, or an online resource (e.g., an online encyclopedia, a blog, etc.). The agent may also be given explicit access rights. For example, a user may allow an agent to have access to his/her login and password to access a password protected site. The agent may also be given limited access rights within the document, with selective permission to receive events related to particular classes of meta-data, but not to others, or selective permission to access certain parts of the document, but not others.

Figure 7:
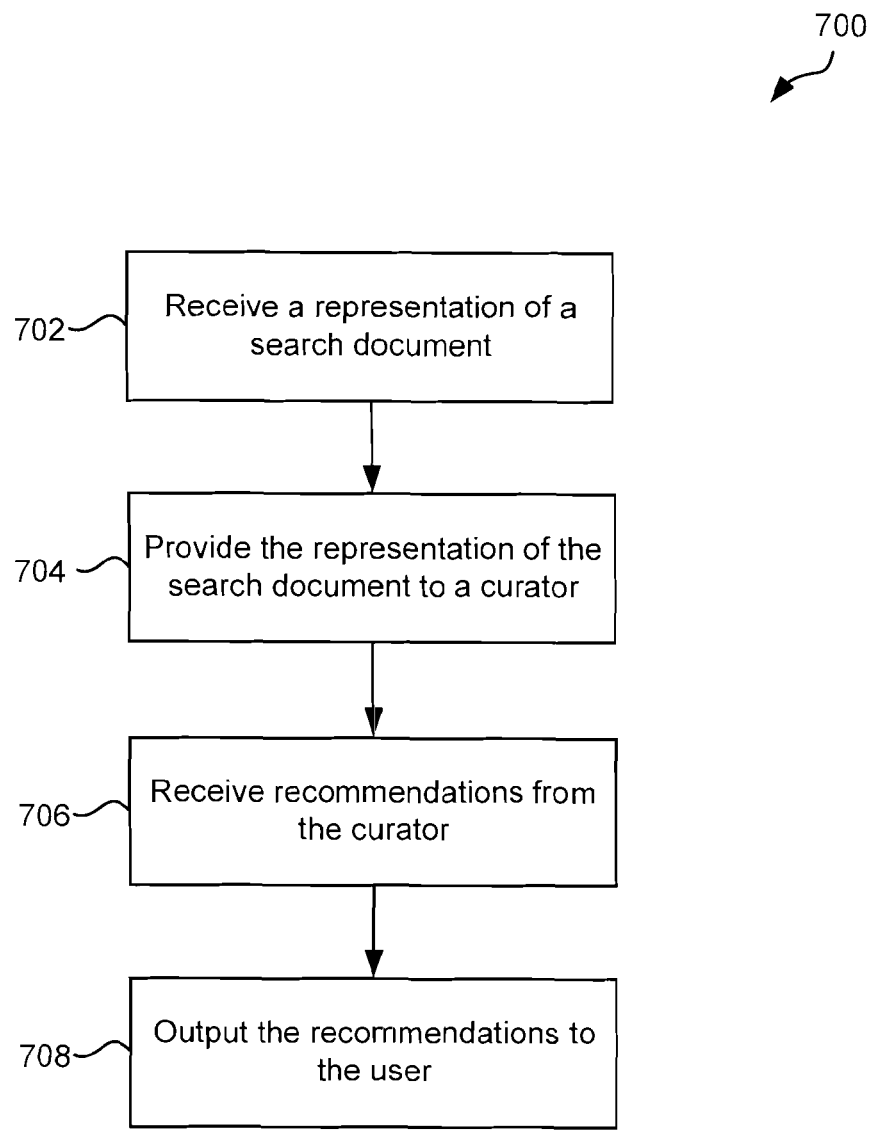
FIG. 7 depicts a simplified flowchart of a method for using a human user to provide recommendations according to one embodiment.

The recommendations may also be provided by a human user who reviews a representation of a user's search document 202. FIG. 7 depicts a simplified flowchart 700 of a method for using a human user to provide recommendations according to one embodiment. Step 702 receives a representation of a search document 202. Step 704 then provides the representation of the search document 202 to a curator. The curator may be a user that is being used to provide recommendations. The curator may be considered an expert or knowledgeable in the area of interest. For example, if a search category is travel, the travel curator may be used.

Search document 202 may be displayed for the curator to review. In one embodiment, search document 202 may show the folders and also search document items that had been stored in search document 202. The curator may then review the items. The curator may be compensated for providing recommendations based on different models. For example, if any of the recommendations result in revenue-producing behavior, such as clicks or purchases, then the curator may be compensated.

Step 706 receives recommendations from the curator. For example, once reading the information in search document 202, the curator may decide that certain recommendations may be appropriate. These recommendations may be determined based on a curator's knowledge. For example, if the curator is familiar with the travel area, the curator may provide different travel websites or provide links to specific air fares or promotional offers. In one embodiment, to ensure quality of a curator's recommendations, the curator may be rated and thus other users can determine the quality of a curator's recommendations that are received.

Step 708 then outputs the recommendations to the user. For example, the recommendations may be output on recommendation bar 206. An icon or other information that indicates the recommendation comes from a curator may be provided. In addition, a rating for the curator may also be shown, such as a number of stars.

More Detailed System Overview

Figure 8:
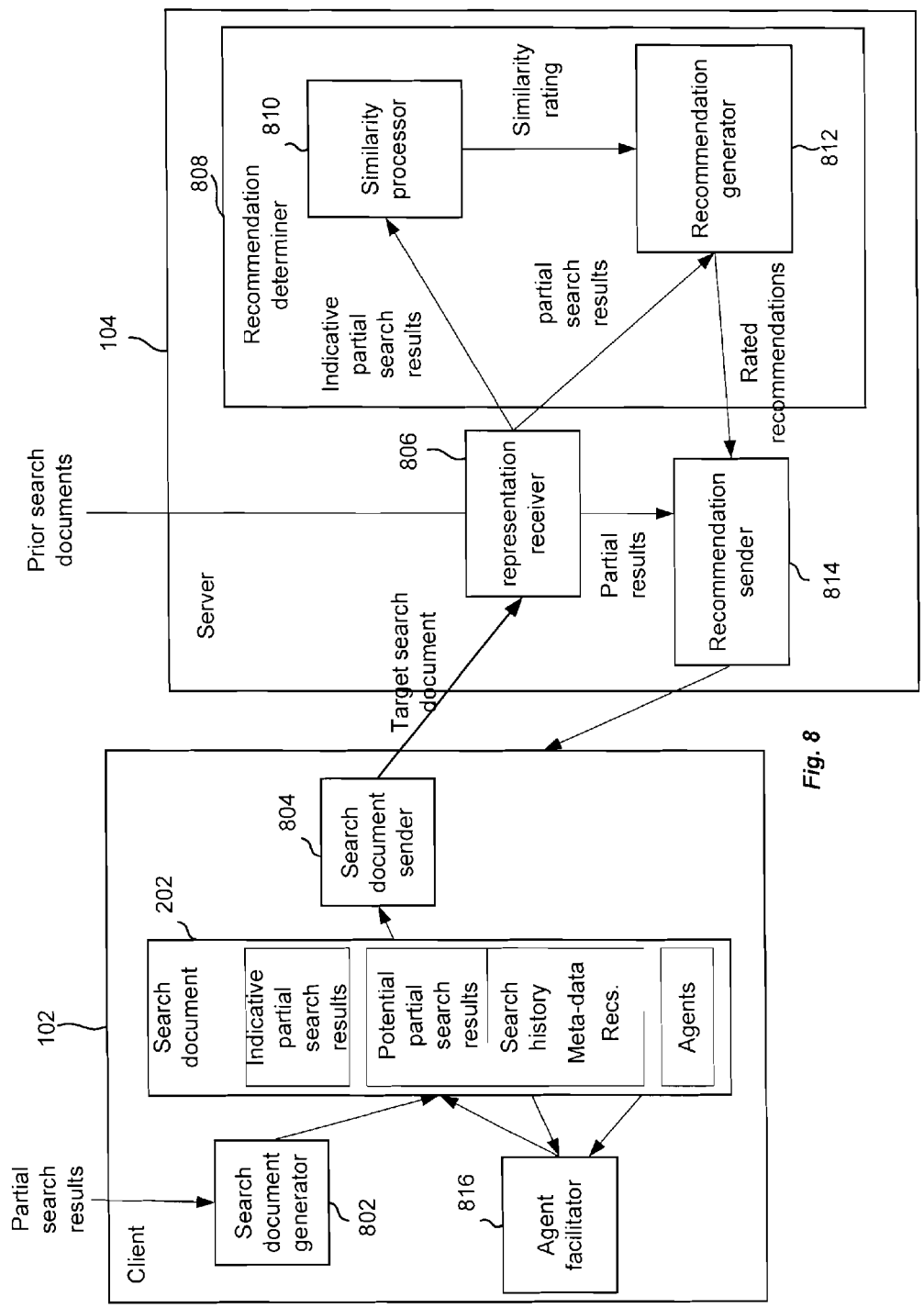
FIG. 8 a more detailed example of a server according to one embodiment.

FIG. 8 a more detailed example of client 104 and server 102 according to one embodiment. At client 104, a search document generator 802 is configured to generate search document 202. For example, partial search results are determined and stored in search document 202. As shown, indicative partial search results are stored along with potential partial search results. The potential partial search results may include the search history, meta-data, and recommendations. In one embodiment, search document 202 is stored in memory at client 104, such as in read-only memory (ROM), cache, flash memory, hard drive, etc.

A search document sender 804 is configured to send a representation of a target search document 202 to server 104. For example, search document representation sender 804 may determine the representation, which may be TF-IDF vector representation of search document 202. The representation is then sent to server 104. In one example, the indicative and potential partial search results are sent to server 104.

A representation receiver 806 is configured to receive the representation of target search document 202. Representation receiver 806 may receive representations of prior search documents 202 from other users also. For example, a target search document 202-1 may be received for providing recommendations for a target user in addition to prior search documents 202-2 from prior users.

A recommendation determiner 808 is configured to determine recommendations from the representations of search documents. For example, a similarity processor 810 determines a similarity between target search document 202-1 and prior search documents 202-2. As described above, the indicative partial search results may be used to determine the similarity.

A recommendation generator 810 then generates recommendations. For example, recommendation generator 810 processes the potential partial search results to determine the recommendations. As described above, the similarity is used to determine resources in the potential partial search results. The recommendations may be rated according to relevancy.

A recommendation provider 814 then outputs the recommendations to client 102. For example, the recommendations or a portion of the recommendations may be sent to client 102. In one embodiment, the portion may be a top ranked portion, such as the top five recommendations. Also, the partial search results for the target search document may be received. Results that have already been found by the user may be removed from the recommendations. That is, a user is not presented recommendations or URLs for web pages that he/she has already found.

The recommendations are then displayed on recommendation bar 206. The recommendations include links to resources that were deemed the most relevant. A agent facilitator 816 is configured to control agents associated with search document 202. For example, agent facilitator 816 applies appropriate search agents to target web pages to create meta-data and then applies that meta-data to the appropriate second search agent to generate recommendations.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of embodiments of the present invention may be any medium that can contain, store the program for use by or in connection with the instruction execution system, apparatus, system or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method for using a target search document, the method comprising:
    determining an indication for activating the target search document;
    determining one or more partial search results for the target search document as a user is performing a search by accessing a plurality of resources, the one or more partial search results being determined over multiple interactions being performed in a first search by a user;
    storing the one or more partial search results in the target search document;
    providing an interface to the target search document to the user, allowing the user to interact with and modify the one or more partial search results;
    using the target search document including the one or more partial search results for providing a recommendation for the first search; and
    providing, using a computing device, the recommendation for the first search to the user using the one or more partial search results, wherein the recommendation includes a reference to a resource determined from a subset of prior search documents that are dynamically determined from a plurality of prior search documents created, modified, and submitted by other users,
    wherein the subset of prior search documents are dynamically determined by:
        ranking the plurality of prior search documents based on a first relevance calculation, wherein the first relevance calculation compares the plurality of prior search documents to the target search document to determine the ranking, and
        selecting the subset of prior search documents, the subset including a number of prior search documents considered to be most relevant to the target search document in the ranking of plurality of prior search documents,
    wherein the recommendation of the reference to the resource is dynamically provided for the first search from one or more partial search results found in the subset of prior search documents by:
        ranking, a plurality of resources contained in the one or more partial search results found in the subset of prior search documents based on a second relevance calculation, the second relevance calculation based on a calculated importance of a resource in comparison to calculated importance of other resources in the plurality of resources, and
        determining the resource in the ranked plurality of resources, the resource being considered to be a highest ranked resource in the plurality of resources.

2. The method of claim 1, wherein providing the recommendation comprises:
    sending a representation of the target search document to a server; and receiving the recommendation from the server, the recommendation being determined by the server based on the one or more partial search results found in the subset of prior search documents.

3. The method of claim 1, wherein providing the recommendation comprises:
   determining metadata based on the one or more partial search results found in the subset of prior search documents, the metadata associated with a first resource;
   determining an agent for a second resource; and
   using the agent to determine the recommendation using the metadata associated with the first resource, the recommendation automatically determined from the second resource.

4. The method of claim 1, further comprising organizing the one or more partial search results found in the target search document into one or more folders in the target search document either automatically or by user-specification.

5. The method of claim 1, wherein determining one or more partial search results comprises:
   reviewing information in the one or more resources;
   determining a partial search result based on a relevance to the target search document; and
   storing the partial search result in the target search document.

6. The method of claim 1, wherein determining one or more partial search results for the target search document comprises:
   receiving a selection from the user indicating a partial search result; and
   storing the selected partial search result in the target search document.

7. The method of claim 1, wherein providing the recommendation comprises using information determined from user interaction with, or modification of, one or more partial search results in the subset of prior search documents to determine the recommendation.

8. The method of claim 1, wherein the recommendation is provided by a second user, who received a representation of the target search document.

9. The method of claim 1, wherein the one or more partial search results found in the subset of prior search documents comprise indicative partial search results and potential partial search results.

10. A method for providing recommendations, the method comprising:
    using a target search document for a user to determine a recommendation, the target search document including target search information related to multiple interactions performed in a first search by a user;
    determining a plurality of prior search documents created, modified, and submitted by other users, each of the plurality of prior search documents including prior search information related to multiple interactions performed in a prior search;
    in response to receiving the target search information, dynamically determining a subset of prior search documents from the plurality of prior search documents using the target search information, wherein the subset of prior search documents are dynamically determined by:
      ranking the plurality of prior search documents based on a first relevance calculation, wherein the first relevance calculation compares the plurality of prior search documents to the target search document to determine the ranking, and
      selecting, the subset of prior search documents, the subset including a number of prior search documents considered to be most relevant to the target search document in the ranking of plurality of prior search documents;
    dynamically determining, using a computing device, the recommendation of a resource for the first search using the one or more partial search results found in the subset of prior search documents by:
      ranking a plurality of resources contained in the one or more partial search results found in the subset of prior search documents based on a second relevance calculation, the second relevance calculation based on a calculated importance of a resource in comparison to calculated importance of other resources in the plurality of resources, and
      determining the resource in the ranked plurality of resources, the resource being considered to be a highest ranked resource in the plurality of resources,
    providing the determined recommendation to the user.

11. The method of claim 10, wherein determining the subset of prior search documents comprises:
    determining a similarity rating for the plurality of prior search documents; and
    determining the subset of prior search documents using the similarity rating for the plurality of search documents.

12. The method of claim 11, wherein the similarity rating is determined using indicative partial search results in the target search document and indicative partial search results in a prior search document to determine a similarity rating for the prior search document.

13. The method of claim 11, further comprising using the similarity rating to rate resources found within the prior search documents.

14. The method of claim 13, wherein using the similarity rating comprises:
    determining resources in a prior search document; and
    rating the resources based on the similarity rating.

15. The method of claim 14, wherein the resources are found in potential search results.

16. The method of claim 14, wherein rating the resources comprises:
    determining a contribution value based on the similarity rating and an indicativeness rating for each resource; and
    determining a recommendation value based on contribution values for similar resources across the prior search documents.

17. The method of claim 10, further comprising:
    determining partial search results for the target search document; and
    removing any partial search results that are found in the recommendation determined.

18. A non-transitory computer-readable storage media including logic for execution by one or more computer processors and when executed operable to:
    determine an indication for activating the target search document;
    determine one or more partial search results for the target search document as a user is performing a search by accessing a plurality of resources, the one or more partial search results being determined over multiple interactions being performed in a first search by a user;
    store the one or more partial search results in the target search document;
    provide an interface to the target search document to the user, allowing the user to interact with and modify the one or more partial search results;

use the target search document including the one or more partial search results for providing a recommendation for the first search; and provide the recommendation for the first search to the user using the one or more partial search results, wherein the recommendation includes a reference to a resource determined from a subset of prior search documents that are dynamically determined from a plurality of prior search documents created, modified, and submitted by other users, wherein the logic to dynamically determine the subset of prior search documents is operable to:

rank the plurality of prior search documents based on a first relevance calculation, wherein the first relevance calculation compares the plurality of prior search documents to the target search document to determine the ranking, and select the subset of prior search documents, the subset including a number of prior search documents considered to be most relevant to the target search document in the ranking of plurality of prior search documents, wherein the logic to dynamically provide the recommendation of the reference to the resource for the first search from one or more partial search results found in the subset of prior search documents is operable to:

rank a plurality of resources contained in the one or more partial search results found in the subset of prior search documents based on a second relevance calculation, the second relevance calculation based on a calculated importance of a resource in comparison to calculated importance of other resources in the plurality of resources, and determine the resource in the ranked plurality of resources, the resource being considered to be a highest ranked resource in the plurality of resources.

19. A non-transitory computer-readable storage media including logic for execution by one or more computer processors and when executed operable to:

use a target search document for a user to determine a recommendation, the target search document including target search information related to multiple interactions performed in a first search by a user;

determine a plurality of prior search documents created, modified, and submitted by other users, each of the plurality of prior search documents including prior search information related to multiple interactions performed in a prior search;

in response to receiving the target search information, dynamically determine a subset of prior search documents from the plurality of prior search documents using the target information, wherein the logic to dynamically determine the subset of prior search documents is operable to:

rank the plurality of prior search documents based on a first relevance calculation, wherein the first relevance calculation compares the plurality of prior search documents to the target search document to determine the ranking, and select the subset of prior search documents, the subset including a number of prior search documents considered to be most relevant to the target search document in the ranking of plurality of prior search documents;

dynamically determine the recommendation of a resource for the first search using the one or more partial search results found in the subset of prior search documents, wherein the logic to dynamically determine the recommendation is operable to:

rank a plurality of resources contained in the one or more partial search results found in the subset of prior search documents based on a second relevance calculation, the second relevance calculation based on a calculated importance of a resource in comparison to calculated importance of other resources in the plurality of resources, and determine the resource in the ranked plurality of resources, the resource being considered to he a highest ranked resource in the plurality of resources, provide the determined recommendation to the user.

20. The method of claim 1, wherein subset of prior search documents is determined based on a similarity rating of prior search documents.

21. The method of claim 1, further comprising:

receiving the plurality of prior search documents at the computing device; and determining, at the computing device, the recommendation at the computing device using the subset of prior search documents.

* * * * *